(12) United States Patent  (10) Patent No.: US 8,374,866 B2
Weinstein et al.  (45) Date of Patent: Feb. 12, 2013

(54) GENERATING ACOUSTIC MODELS

(75) Inventors: Eugene Weinstein, New York, NY (US); Pedro J. Moreno Mengibar, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/545,360

(22) Filed: Jul. 10, 2012

(65) Prior Publication Data

US 2012/0278061 A1 Nov. 1, 2012

Related U.S. Application Data

(63) Continuation of application No. PCT/US2011/059812, filed on Nov. 8, 2011.

(60) Provisional application No. 61/411,414, filed on Nov. 8, 2010.

(51) Int. Cl.
*G10L 15/06* (2006.01)
*G10L 15/04* (2006.01)

(52) U.S. Cl. ....................... 704/243; 704/251

(58) Field of Classification Search ........... 704/231–257
See application file for complete search history.

(56) References Cited

U.S. PATENT DOCUMENTS

| | | | |
|---|---|---|---|
| 7,295,979 B2 * | 11/2007 | Neti et al. ................. | 704/243 |
| 7,386,443 B1 | 6/2008 | Parthasarathy et al. | |
| 2002/0040296 A1 * | 4/2002 | Kienappel .................. | 704/220 |
| 2002/0111805 A1 * | 8/2002 | Goronzy et al. ............ | 704/250 |
| 2005/0197835 A1 * | 9/2005 | Reinhard et al. ........... | 704/249 |
| 2006/0020462 A1 * | 1/2006 | Reich ......................... | 704/254 |

OTHER PUBLICATIONS

Alberti et al; An audio indexing system for election video; International Conference on Acoustics, Speech and; 2009; pp. 4873-4876.
Chen et al; Scaling shrinkage-based language models; Tech. Rep., IBM Research Division; 2010; pp. 1-20.
Gauvain et al; Maximum a posteriori estimation for multivariate gaussian mixture observations of markov chains; IEEE Trans. Speech and Audio Processing; 1994; pp. 2(2):291-298.
International Search Report; Geibler, C. ; Jan. 25, 2012; World Intellectual Property Organization (WIPO) (International Bureau of); PCT/US2011/059812; 12 pages.
Hirschberg et al; SCANMail: Browsing and searching; Eurospeech; 2001; 4 pages.
Huang et al; Performance improvements in voicemail transcription; Speech Transcription Workshop; 2000; 4 pages.
Lee et al; On Adaptive Decision Rules and Decision Parameter Adaptation for Automatic Speech Recognition; Proceedings of the IEEE; 2000; pp. 88(8):1241-1269.
Liao et al; Decision tree state clustering with word and syllable features; Interspeech; 2010; pp. 2958-2961.
Padmanabhan et al; Automatic speech recognition performance on a voicemail transcription task; IEEE Transactions on Speech and Audio Processing; 2002; pp. 10(7):433-442.
Ramabhadran et al; The IBM 2007 speech transcription system for European parliamentary speeches; Automatic Speech Recognition & Understanding; 2007; pp. 472-477.
Shugrina; Formatting time-aligned asr transcripts for readability; NAACL HLT; 2010; pp. 198-206.
Young; HMMs and related speech recognition technologies; Springer Handbook of Speech Processing; 2007; 26 pages.

* cited by examiner

*Primary Examiner* — Samuel G Neway
(74) *Attorney, Agent, or Firm* — Fish & Richardson P.C.

(57) ABSTRACT

This document describes methods, systems, techniques, and computer program products for generating and/or modifying acoustic models. Acoustic models and/or transformations for a target language/dialect can be generated and/or modified using acoustic models and/or transformations from a source language/dialect.

20 Claims, 7 Drawing Sheets

United States Patent US 8,374,866 B2

GENERATING ACOUSTIC MODELS

CROSS-REFERENCE TO RELATED APPLICATIONS

This application is a continuation of and claims priority to PCT/US2011/059812 filed on Nov. 8, 2011, which claims priority under 35 U.S.C. §119(e)(1), to U.S. Provisional Application Ser. No. 61/411,414, filed on Nov. 8, 2010, the entire contents of which are incorporated herein by reference.

TECHNICAL FIELD

This document relates to speech recognition.

BACKGROUND

Acoustic models have been used to transcribe audio data (e.g., digital voice recordings), such as generating text transcripts of voicemail messages. Acoustic models can map portions of speech, such as phonemes (smallest unit of sound used for identifying meaningful contrasts between utterances in a spoken language), to audio data within a particular audio feature space. A feature space includes ranges of audio attributes (e.g., range of pitch) that bound audio data within the feature space. Audio data can be transformed into different feature spaces to make the same portions of speech (e.g., the same phonemes) uttered by different speakers appear more similar. For example, various transformations (e.g., Linear Discriminant Analysis (LDA), Vocal Tract Length Normalization (VTLN), Constrained Maximum Likelihood Linear Regression (CMLLR)) can be applied to audio data so that phonemes (e.g., the /a/ phoneme) uttered by a first speaker with a high pitched voice appear similar to the same phonemes as uttered by a second person with a low pitched voice.

Different acoustic models can be used for different languages (e.g., English and French) and/or for different dialects in the same language (e.g., U.S. English and U.K. English).

SUMMARY

This document generally describes generating acoustic models for converting audio data into textual data. Acoustic models and/or transformations for a target language (or domain) can be generated using acoustic models and/or transformations from a source language. For example, an acoustic model for U.K. English may be generated using an acoustic model for U.S. English. Cross-domain and/or cross-dialect acoustic model generation can be performed by applying one or more source acoustic models in one or more transformed feature spaces (feature spaces resulting from one or more transformations applied to audio data) for a source language to untransformed audio data in a target language.

In one implementation, a computer-implemented method includes receiving, at a computer system, a request to generate or modify a target acoustic model for a target language; accessing, by the computer system, a source acoustic model for a source language, wherein the source acoustic model includes information that maps acoustic features of the source language to phonemes in a transformed feature space; aligning, using the source acoustic model in the transformed feature space, untransformed voice data in the target language with phonemes in a corresponding textual transcript to obtain aligned voice data, wherein the untransformed voice data is in an untransformed feature space; transforming the aligned voice data according to a particular transform operation using the source acoustic model to obtain transformed voice data; adapting the source acoustic model to the target language using the untransformed voice data in the target language to obtain an adapted acoustic model; training, by the computer system, a target acoustic model for the target language using the transformed voice data and the adapted acoustic model; and providing the target acoustic model in association with the target language.

One or more additional features can be included can be included in such an implementation. For example, the transformed feature space of the source acoustic model can be a Constrained Maximum Likelihood Linear Regression (CMLLR) feature space that is generated from a CMLLR transform operation; the source acoustic model can be generated from performance of a Linear Discriminant Analysis (LDA) transform operation, Vocal Tract Length Normalization (VTLN) transform operation, and a CMLLR transform operation on training data in the source language; the training data can include voice data in the source language and corresponding textual transcripts; the particular transform operation can include a VTLN transform operation that is performed on the aligned voice data using the source acoustic model; the source acoustic model can be adapted to the target language by performing a maximum a posteriori (MAP) adaptation operation on the source acoustic model using the untransformed voice data in the target language; training the target acoustic model can include performing a CMLLR transform operation and a maximum mutual information (MMI) transform operation using the transformed voice data and the adapted acoustic model; the target language and the source language can be different dialects of a common language; and/or the target language and the source language can be different languages.

In another implementation, a system includes a computer system; an interface of the computer system to receive a request to generate or modify a target acoustic model for a target language; an acoustic model repository of the computer system to provide access to a source acoustic model for a source language, wherein the source acoustic model includes information that maps acoustic features of the source language to phonemes in a transformed feature space; an alignment component of the computer system to use the source acoustic model in the transformed feature space to align untransformed voice data in the target language with phonemes in a corresponding textual transcript to obtain aligned voice data, wherein the untransformed voice data is in an untransformed feature space; and a target model generator of the computer system to i) transform the aligned voice data according to a particular transform operation using the source acoustic model to obtain transformed voice data, ii) adapt the source acoustic model to the target language using the untransformed voice data in the target language to obtain an adapted acoustic model; and iii) train a target acoustic model for the target language using the transformed voice data and the adapted acoustic model; wherein the interface is further configured to provide access to the target acoustic model.

One or more additional features can be included in such an implementation. For example, the transformed feature space of the source acoustic model can be a Constrained Maximum Likelihood Linear Regression (CMLLR) feature space that is generated from a CMLLR transform operation; the system can also include a source model generator to generate the source acoustic model from performance of a Linear Discriminant Analysis (LDA) transform operation, Vocal Tract Length Normalization (VTLN) transform operation, and a CMLLR transform operation on training data in the source language; the training data can include voice data in the source language and corresponding textual transcripts; the particular transform operation can include a VTLN transform operation that is performed on the aligned voice data using the source acoustic model; the source acoustic model can be adapted to the target language by performing a maximum a posteriori (MAP) adaptation operation on the source acoustic model using the untransformed voice data in the target language; training the target acoustic model can include performing a CMLLR transform operation and a maximum mutual information (MMI) transform operation using the transformed voice data and the adapted acoustic model; the target language and the source language can be different dialects of a common language; and/or the target language and the source language can be different languages.

In another implementation, a system includes a computer system; an interface of the computer system to receive a request to generate or modify a target acoustic model for a target language; an acoustic model repository of the computer system to provide access to a source acoustic model for a source language, wherein the source acoustic model includes information that maps acoustic features of the source language to phonemes in a transformed feature space; an alignment component of the computer system to use the source acoustic model in the transformed feature space to align untransformed voice data in the target language with phonemes in a corresponding textual transcript to obtain aligned voice data, wherein the untransformed voice data is in an untransformed feature space; and means for generating a target acoustic model for a target language from using the source acoustic model in the transformed feature space and the aligned voice data in the untransformed feature space; wherein the interface is further configured to provide access to the target acoustic model.

One or more additional features can be included in such an implementation. For example, the transformed feature space of the source acoustic model can be a Constrained Maximum Likelihood Linear Regression (CMLLR) feature space that is generated from a CMLLR transform operation; the system can further include a source model generator of the computer system to generate the source acoustic model from performance of a Linear Discriminant Analysis (LDA) transform operation, Vocal Tract Length Normalization (VTLN) transform operation, and a CMLLR transform operation on training data in the source language; the training data can include voice data in the source language and corresponding textual transcripts; and/or the means for generating the target acoustic model can use a VTLN transform operation, a posteriori (MAP) adaptation operation, a CMLLR transform operation, and a maximum mutual information (MMI) transform operation using the source acoustic model and the aligned voice data.

The details of one or more embodiments are set forth in the accompanying drawings and the description below. Various advantages can be provided. For example, better acoustic models and corresponding transformations that more accurately identify parts of speech as uttered by different speakers can be generated. For instance, the accuracy of an acoustic model can depend on the amount and diversity of transcribed audio data that is available to train the acoustic model and the corresponding transformations. However, ample transcribed audio data for training an acoustic model may not be available in some languages. Acoustic models and transformations for a target language can be generated using available training data for the target language and by leveraging other acoustic models that were generated from training data in other languages. For example, with languages where the amount and/or diversity of training data is limited, accurate acoustic models and transformations can be generated by leveraging acoustic models that were generated from larger and more robust training data.

Other features, objects, and advantages will be apparent from the description and drawings, and/or from the claims.

DESCRIPTION OF DRAWINGS

Like reference symbols in the various drawings indicate like elements.

DETAILED DESCRIPTION

Acoustic models and corresponding transformations of audio data for a target language (e.g., English, French) can be generated using acoustic models from one or more source languages. For example, an acoustic model for transcribing audio data in U.K. English can be generated from an acoustic model for U.S. English. Such cross-domain and/or cross-dialect acoustic model generation can allow for more robust and accurate acoustic models to be generated.

To generate (or train) an acoustic model for transcribing audio data in a particular language, training data in the particular language can be used. Training data can include audio data (e.g., digital voice recordings) and textual transcripts that map particular portions of the audio data to text (e.g., words, portions of words). Training data may be generated and/or verified by humans to ensure accuracy before it is used for generating an acoustic model—accordingly, training data can be expensive and time consuming to produce.

Training data can be used to create transformations that are applied to audio data, such as LDA, VTLN, and CMLLR. Transformations can place audio data into a new feature space. In technical terms, a transformation can be accomplished by multiplying a time slice of acoustic features by a matrix. Transformations can make speech samples from multiple speakers look more similar to each other. For example, some transformations can make high-pitched voices look a bit more similar to average pitched voices, and the same for low pitched voices. Other transformations can handle other audio effects (beyond pitch) such as noise, or the way some phonemes sound.

Training data can also be used to generate one or more acoustic models that correspond to transformed audio data.

The choice of corpus of training data for acoustic and acoustic model training is one step in putting together a high-quality speech recognition system. A mismatch between training and test data in acoustic or channel conditions, speaker characteristics, and/or topics discussed can be a factor of degraded speech recognition performance. For example, if the training data includes mostly low-pitched speakers discussing the weather, a resulting acoustic model may not accurately transcribe audio data for high-pitched speakers discussing topics other than the weather. Such mismatches between training data and test data have been found in previous research on cross-domain training of audio transcription systems (e.g., using U.S. English training data to generate an acoustic model for U.K. English). In light of this, acoustic models have been trained using one or more in-domain corpora of audio data for a target language (e.g., using French audio data for training a French acoustic model).

Given the potential amount of resources that may be needed to generate training data (e.g., even though scripts and/or scenarios can be automatically generated, as discussed above, audio data may be created using a multitude of people with varied voices to provide a robust corpus of training data), there may be an insufficient amount and/or breadth of training data available for particular languages. For example, there may be a wealth of training data for U.S. English (e.g., diverse speakers talking about diverse topics) but there may be an insufficient amount of training data available in U.K. English to generate a transformations and a corresponding acoustic model to transcribe audio samples from U.K. English speakers with at least a threshold level of accuracy. This document describes cross-domain acoustic model generation, which can allow for accurate acoustic models to be generated for languages for which there is insufficient amount of training data available for generating an acoustic model.

As described in greater detail below with regard to the figures, cross-domain acoustic model generation can include applying a source acoustic model for a source language that corresponds to transformed audio data in the source language to raw (not transformed) audio data in a target language and adapting the source acoustic model to the target language. Traditionally, application of a transformed acoustic model to untransformed audio data would present a problem based on a mismatch of the feature space for the acoustic model and the audio data. However, the technology discussed in this document provides accurate cross-domain acoustic models in spite of the feature space mismatch.

Figure 1:
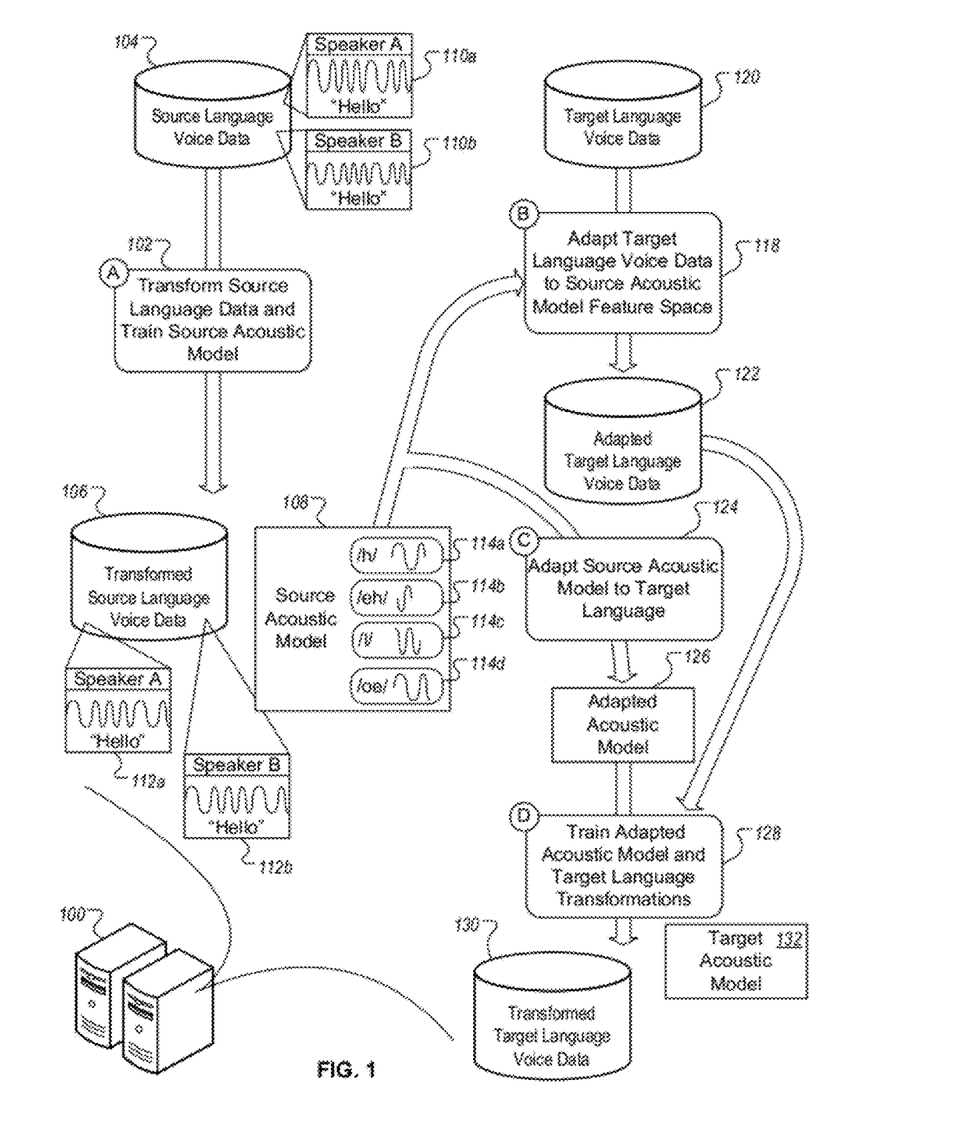
FIG. 1 is a conceptual diagram of an example system for generating cross-domain or cross-dialect acoustic models.

FIG. 1 is a conceptual diagram of an example system for generating cross-domain or cross-dialect acoustic models. The example system can generate an acoustic model and corresponding transformations to be applied to audio data for a target language based on an acoustic model for a source language. The example system can be implemented by one or more computing devices 100, such as a distributed computing system (e.g., a cloud computing system).

As indicated by step A (102), source language data 104 is transformed and a source acoustic model is trained to create transformed source language data 106 and a source acoustic model 108. The source language voice data 104 can include at least a threshold of diversity of speakers discussing topics in the source language. For instance, example voice data from Speakers A and B saying the word "hello" is depicted in boxes 110a-b. As demonstrated by boxes 110a-b, the audio data provided from different speakers (Speakers A and B) regarding the same word can vary.

The transformations applied to the source language voice data 104 in step A (102) cause the voice data from different speakers regarding the same portions of the source language (e.g., same words, same phonemes) to appear more similar. For example, the transformations applied to the voice data depicted in boxes 110a-b for Speakers A and B can cause the voice data to become more uniform, even though it was uttered by different speakers. Such increased uniformity can allow for increased accuracy when transcribing voice data into textual data.

The transformations applied at step A (102) can include one or more techniques for transforming audio data, such as LDA, VTLN, and/or CMLLR. These techniques can include various parameters (e.g., coefficients, variables) that are generated through training the techniques with training data in the source language. Some of the parameters can be global and applied universally to the source language voice data 104, and some parameters can be individually determined for particular voice data (e.g., different parameters for voice data from Speaker A and Speaker B). A variety of appropriate combinations of transformations can be used, as described in greater detail with regard to FIGS. 2 and 3.

The resulting transformed source language voice data 106 can be more similar than the untransformed source language voice data 104—reducing the variance caused by disparate speakers and/or acoustic environments. For instance, boxes 112a-b depict the transformed voice data from Speakers A and B for the word "hello" being the same.

An example source acoustic model 108 is depicted as including mappings 114a-d between phonemes and transformed voice data. For example, the phoneme /h/ is depicted as being mapped to a particular portion of voice data in the transformed feature space and the phoneme /eh/ is depicted as being mapped to a different portion of voice data in the transformed feature space.

The trained source acoustic model 108 can be used to generate an acoustic model for the target language. As indicated by step B (118), the source acoustic model 108 can be used to adapt the target language voice data to a feature space that corresponds to the feature space of the source language model (e.g., adapt target language voice data 120 from an untransformed feature space to a LDA, VTLN, and/or CMLLR feature space). Adapting the target language voice data 120 can include aligning textual transcripts to audio data in the target language voice data 120 using the source acoustic model 108. Aligning a voice recording with its textual transcript can include, for each phonemes in the textual transcript, identifying a corresponding segment of the voice recording and marking the segment as corresponding to a phoneme in the textual transcript.

Adapting the target language voice data 120 can also include training a transform operation for the feature space of the source acoustic model 108 on the aligned target language voice data 120. For example, if the source language model 108 is in a CMLLR feature space, then CMLLR transform can be applied to the aligned target language voice data 120 to learn the CMLLR transform for the target language voice data 120 and to get the target language voice data 120 into the same feature space as the source acoustic model 108. Adaptation of the target language voice data 120 can generate adapted target language voice data 122, which is in the same feature space as the source acoustic model 108.

As indicated by step C (124), the source acoustic model 108 can be adapted to the target language to generate an adapted acoustic model 126. A variety of techniques can be used to adapt the source acoustic model 108 to the target language, such as acoustic model adaptation using a maximum a posteriori (MAP) estimation technique.

As indicated by step D (128), the adapted acoustic model 126 can be trained using the adapted target language voice data 122 and the adapted acoustic model 126. With the target language voice data 120 adapted to the same acoustic space as the adapted acoustic model 126, a target acoustic model 132 can be trained for the target language using the adapted target language voice data 122 and the adapted acoustic model 126. Such training can leverage the quality of the source acoustic model 108, which is used to initially seed and train the target acoustic model 132. Training can also produce transformed target language voice data 130, which can include transformed audio data that with more similarity for among phonemes uttered by different speakers than the untransformed target language voice data 120.

The target acoustic model 132 can subsequently be used by the one or more computing devices 100, and/or by another computer system, to transcribe audio data from speakers of the target language.

Figure 2:
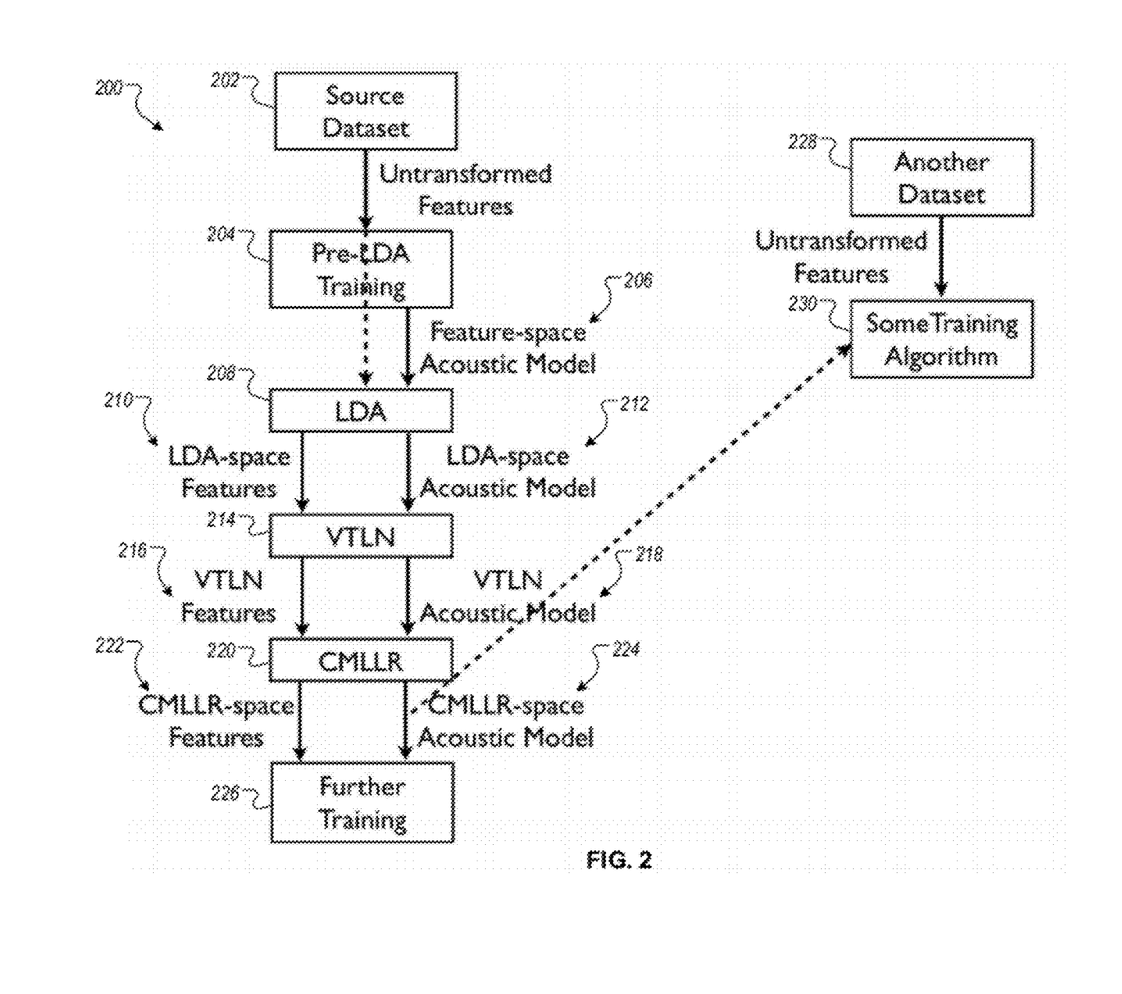
FIG. 2 is a flow chart of an example technique for generating a source acoustic model and/or source transformations to be used for cross-domain and/or cross-dialect acoustic model generation.

FIG. 2 is a flow chart of an example technique 200 for generating a source acoustic model and/or source transformations to be used for cross-domain and/or cross-dialect acoustic model generation. The technique 200 can be performed by one or more appropriate computing devices, such as the one or more computing devices 100 described above with regard to FIG. 1.

The technique 200 can begin with a source dataset 202 that includes audio data with untransformed acoustic features. The source dataset 202 can be similar to the source language voice data 104 discussed above with regard to FIG. 1.

The subsequent steps of the technique 200 can modify the acoustic features of the source dataset 202 to have less variance and to appear more similar. In conjunction with transforming the acoustic features, each step can also involve re-training an acoustic model to correspond to the transformed features of the source dataset 202. An acoustic model's applicability may be limited to a particular feature space. As the source dataset 202 is transformed and the feature space for the source dataset 202 changes, an acoustic model for the source language can be transformed as well.

The technique 200 can include pre-LDA training (step 204) in which a feature-space acoustic model 206 is generated for the untransformed features of the source dataset 202. For example, pre-LDA training can include alignment of acoustic data in the source dataset 202 with a corresponding reference textual transcript. An alignment can cause segments of the acoustic data in the source dataset 202 to be associated on a phoneme level to phonemes in the reference textual transcript. Each phoneme in the reference textual transcript can be associated with a segment of the acoustic data that is the acoustic realization of that phoneme. Such an alignment of acoustic features on a phoneme level can be used to generate the acoustic model 206 for the source dataset 202 in the untransformed feature-space.

An initial transformation of the source dataset 202 can include Linear Discriminant Analysis (LDA), which is depicted in the technique 200 as step 208. LDA is a technique that seeks to find an optimally discriminative global transform (a rotation in the feature space) given the source dataset 202. An LDA transform seeks the best discrimination between acoustic phoneme classes on the training set (e.g., differentiate an "ah" sound from an "aa" sound) and is global in the sense that a single transform is computed for all training data. Performing the LDA transformation on the source dataset 202 can result in a transformed dataset with LDA-space features 210, and can result in transformation of the acoustic model 206 into an LDA-space acoustic model 212.

The transformed dataset with LDA-space features 210 and the LDA-space acoustic model 212 can subsequently be transformed using Vocal Tract Length Normalization (VTLN), which is depicted in the technique 200 as step 214. Before or as part of the VTLN transformation, the LDA-space features of the source dataset 202 can be aligned with the corresponding reference transcript for the source dataset 202 using the LDA-space acoustic model 212. VTLN seeks to compensate for distinct characteristics of different speakers that influence the way they speak. For example, due to the typically longer vocal tract in male speakers, the frequencies present in voice recordings of men are typically lower than in the frequencies present in voice recordings of women. The VTLN algorithm finds an optimal warping factor (e.g., a single floating-point number) per voice recording that gives the best match to the acoustic model being used. The features of the audio data are compressed or dilated by the warping factor, ideally bringing disparate recordings in the entire data corpus to compatible baseline frequencies. Performing the VTLN transformation on the dataset with LDA-space features 210 can result in a transformed dataset with VTLN-space features 216, and can result in transformation of the LDA-space acoustic model 212 into a VTLN-space acoustic mode 218.

The transformed dataset with VTLN-space features 216 and the VTLN-space acoustic model 218 can subsequently be transformed using Constrained Maximum Likelihood Linear Regression (CMLLR), which is depicted in the technique 200 as step 220. Before or as part of the CMLLR transformation, the VTLN-space features of the source dataset 202 can be aligned with the corresponding reference transcript for the source dataset 202 using the VTLN-space acoustic model 218. CMLLR seeks to find a linear transformation that maximizes the model likelihood on a particular speech recording. This is a single transform per voice recording that seeks to optimize model performance on that given voice recording. The implementation of the feature transformation is similar to that of LDA, with a difference being that a CMLLR transform is distinct to the voice recording and the LDA transform is global for all data. Performing the CMLLR transformation on the dataset with VTLN-space features 216 can result in a transformed dataset with CMLLR-space features 222, and can result in transformation of the VTLN-space acoustic mode 218 into a CMLLR-space acoustic model 224.

The application of VTLN and CMLLR to the source dataset 202 can assume that each voice recording is provided entirely by the same speaker. Additionally, in some implementations these feature transformations may be limited to single voice recordings and may be not spread across multiple voicemails by the same speaker.

As described above, as features of the dataset 202 are transformed by each step in the technique 200, the corresponding acoustic model can be transformed as well. If the data changes (because of one or more transformations), the acoustic model that explains the data can be changed as well.

Additional transformations can be applied to the CMLLR-space dataset 222 and/or the CMLLR-space acoustic model 224 through further training, as indicated by step 226. For example, maximum mutual information (MMI) discriminative training can be performed on the CMLLR-space acoustic model 224.

The CMLLR-space acoustic model 224 for the source language can be used to generate an acoustic model for another language/dialect, as indicated by the dashed line. For instance, the CMLLR-space acoustic model 224 can be used to generate an acoustic model for another dataset 228 that is associated with another language/dialect and that has untransformed features. A variety of appropriate training algorithms 230 can be used to generate an acoustic model for the other language/dialect using the CMLLR-space acoustic model 224 in the CMLLR feature space and the other dataset 228 in an untransformed feature space.

For example, a U.S. English acoustic model can be adapted to produce a U.K. English acoustic model. A U.S. English acoustic model that is a post-CMLLR trained model, which was trained on data modified with LDA, VTLN, and CMLLR transformations, can be used to generate a U.K. acoustic model. Such cross-dialect acoustic model adaptation can begin with an alignment of textual transcripts to audio data in a U.K. dataset (e.g., the other dataset 228), a process for which an acoustic model is used. However, the U.K. English audio data that is to be adapted to the U.S. English acoustic model is untransformed audio data without any transformations having been applied. There results a "chicken and egg" problem—there are not U.K. acoustic models in the correct feature space for the U.K. audio data (untransformed data) and there are not U.K. transforms to get the U.K. audio data into the same feature space as the U.S. acoustic model; and an alignment model is used to learn those language/dialect specific transforms, but the alignment model for U.K. English does not yet exist. The dashed line represents the use of a model that is not matched to the data that the model is being used to align.

To adapt a source acoustic model in light of the chicken and egg problem described above, a source acoustic model (e.g., U.S. English acoustic model) can be applied to features in a different feature space from the model. One example implementation that has been found to provide an accurate adapted acoustic model in spite of the feature space mismatch includes using a source acoustic model in the VTLN and CMLLR space on non-VTLN and non-CMLLR transformed data to obtain alignments and learn the optimal VTLN transforms for the target language/dialect audio data. After aligning the target language/dialect data (e.g., U.K. English data) and learning the optimal VTLN transforms, the source language/dialect acoustic model (e.g., U.S. model) can be adapted to the target language/dialect audio data (the other dataset 228) using MAP adaptation. The adapted acoustic model can also go through CMLLR training, MMI training, and/or other appropriate training and testing steps for acoustic model training.

Figure 3:
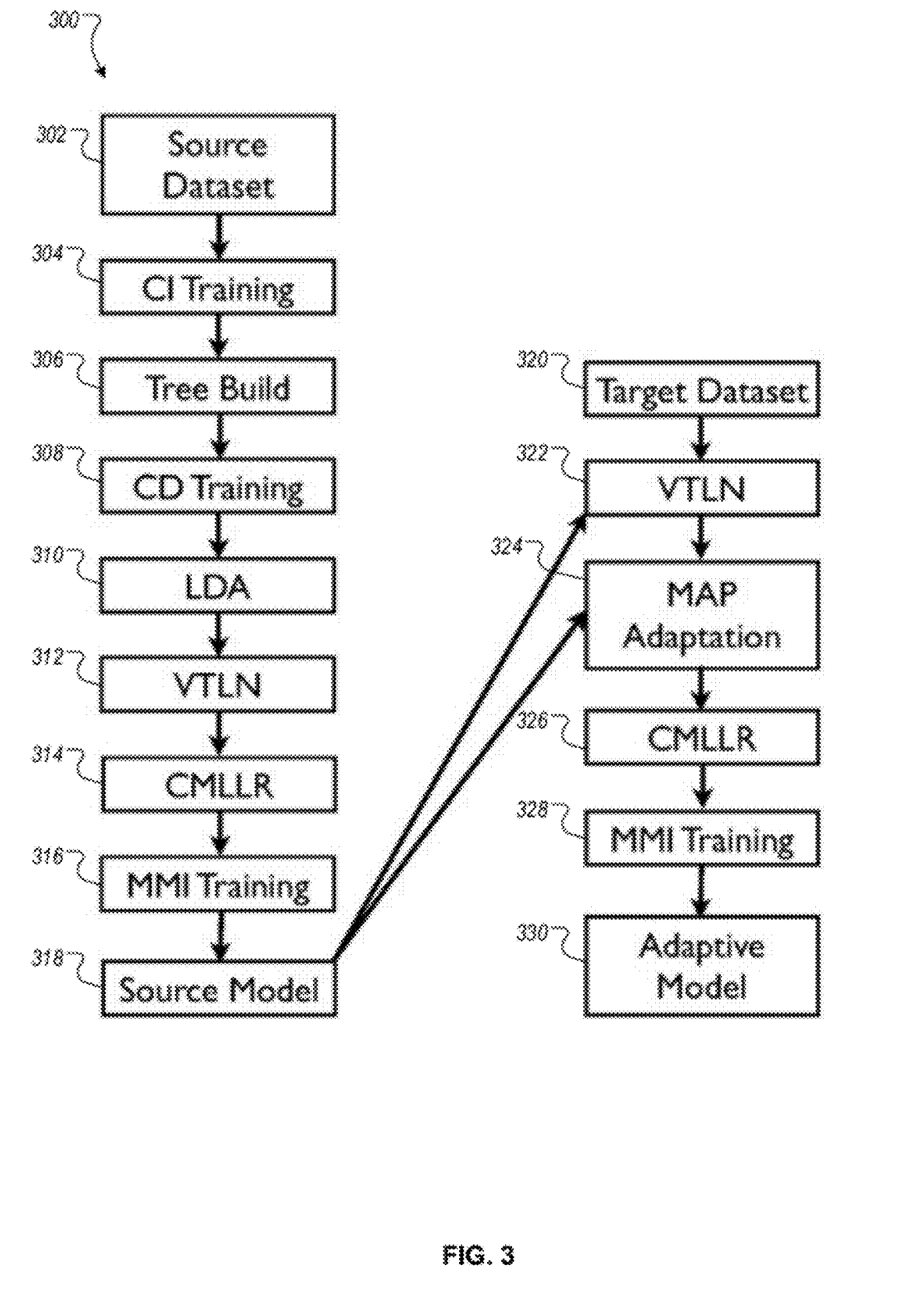
FIG. 3 is a flowchart depicting an example technique for generating target acoustic models for a target language from source acoustic models that correspond to a source language

FIG. 3 is a flowchart depicting an example technique 300 for generating target acoustic models for a target language from source acoustic models that correspond to a source language. The technique 300 includes similar steps as those included in the technique 200, as described with regard to FIG. 2. The technique 300 can be performed by any of a variety of appropriate computing devices, such as the one or more computing device 100 described above with regard to FIG. 1.

The technique 300 can start with a source dataset 302. The source dataset 302 can be similar to the source dataset 202 described above with regard to FIG. 2. The source dataset 302 can include audio data (e.g., digital voice recordings) in the source language and corresponding textual transcripts.

The technique 300 can include various transform operations that transform the source dataset 302 into feature spaces to make voice recordings from different speakers in different acoustic environments appear more similar. The arrows depicted in FIG. 3 indicate that an acoustic model is being used to produce alignments between the audio data and the corresponding textual transcript within the feature space. For example, the arrow from the source dataset 302 to the context-inclusive (CI) training step 304 indicates that the source dataset 302 is aligned and that the step 304 is performed on the aligned source dataset 302.

Transform operations, such as the CI inclusive training, can be performed using a variety of techniques. For example, acoustic models can be trained using Perceptual Linear Prediction (PLP) with 13 coefficients and their short-term first and second derivatives, modified with Semi-tied Covariance (STC) transforms, and Linear Discriminant Analysis (LDA) transforms (step 310) applied to 9 stacked consecutive speech frames to project down to a 39-dimensional feature vector.

Training of a source acoustic model from the source dataset 302 can include building (CI) acoustic models for the source language (step 304). A set of context-dependent (CD) states can be constructed (step 308) with decision tree splitting (step 306). Both the CI and CD models can be 16-distribution Gaussian mixture models (GMM). Additionally, a maximum likelihood Vocal Tract Length Normalization (VTLN) warping of the observations can be determined (step 312), as well as a Constrained Maximum Likelihood Linear Regression (CMLLR) transform (step 314) at an individual audio recording level. A final acoustic model can be enhanced with Maximum Mutual Information (MMI) discriminative training (step 316). After this step, a multi-pass recognition strategy can be used, in which a transcription resulting from a speaker-independent decoding pass is used to produce alignments to estimate an optimal VTLN warping factor and CMLLR transform. Long voice recordings (e.g., recordings exceeding a threshold amount of time) can be segmented into utterances using a speech segmenter, which can be implemented as an HMM with speech and non-speech states, such as with a 64-distribution GMM at each state.

Acoustic models can be constructed as a trigram model with Kneser-Ney smoothing and entropy shrinking applied. For some languages (e.g., non-English languages), voicemail transcriptions as a data source for acoustic model training can be used, whereas for some languages (e.g., dialects of the same language, such as U.K. and U.S. English) voicemail transcripts can be used, as well as additional acoustic model data sources, such as broadcast news transcripts. Acoustic models can be interpolated linearly with the weights tuned to minimize perplexity on a development set. The interpolation can be performed on preshrinking models, and shrinking can be applied to the combined model.

The transcription process can yield spoken-form audio recordings (e.g., voicemails) with no number formatting or punctuation, and often without proper capitalization. For improved presentation to the users of the transcription technology, a statistical approach can be used to select a likely punctuation and/or capitalization.

In one example, U.K. and U.S. dialects of English are sufficiently different that a U.S. English system may perform less than optimally when applied to a U.K.-accented speech model. For instance, an example U.S. English acoustic model can yield a 37.0% word error rate (WER) on an example U.K. test set. An example U.K.-adapted model constructed using the techniques described in this document can achieve an improved WER, such as a 19.3% WER on the same test set (a 47.8% WER reduction). A good U.S. English acoustic model can be used as a starting point and adapted using MAP adaptation to the U.K. English training data to obtain an improved U.K.-adapted model.

In the examples discussed in this document, a standard adaptation strategy of setting the adapted means to a mixture of the source model means and the Gaussian posterior counts produced for the alignments using the source model can be used, while retaining the covariances of the source model. For each source model Gaussian mean $\mu$ in our system, the resulting adaptive mean is depicted in equation 1 below, where in frame t in target dataset utterance r, $\gamma_r(t)$ is the posterior probability of the Gaussian being adapted accounting for frame t given the reference alignment, and $o_r(t)$ is the observation vector. $\tau$ is the MAP adaptation interpolation parameter. The source acoustic model is used to produce the alignments for this step. Note that this approach assumes that the context dependent state inventory is the same in the source and target language, as the context-dependent model decision tree may not be recreated in this process.

$$\hat{\mu} = \frac{\tau\mu + \sum_{r=1}^{R}\sum_{t=1}^{T_r}\gamma_r(t)o_r(t)}{\tau + \sum_{t=1}^{T_r}\gamma_r(t)} \quad (1)$$

A source model (318) that results from one or more of the steps 304-316 discussed above can be used to produce alignments needed to obtain maximum-likelihood VTLN warps for target dataset (320) observations and to produce the first MAP-adapted model. As a source model operates on features warped with VTLN, a maximum-likelihood VTLN warps can be learned using these alignments to compute counts (step 322). MAP adaptation (step 324) can then be applied, as described above, followed by CMLLR transform estimation and model training (step 326), as well as a final MMI step (step 328). An adaptive model (330) in the target language/dialect can be produced from the steps 322-328.

The source model 318 can be trained with VTLN warping (step 312) as well as in the feature space produced by subsequent application of LDA (step 310) and CMLLR transforms (step 314). The best model (e.g., most accurate model) at the start of the adaptation process can be trained on transformed features from the source dataset, so it is not fully valid to use this model to obtain alignments on the non-feature transformed target dataset. However, feature transforms on the target dataset 320 may not be determined without valid alignments. Hence, this adaptation scenario can present a chicken-and-egg problem. The MAP adaptation step (step 324) can provide alignments using a model trained on VTLN-warped features on unwarped data (step 322). As well, the source model 318 can be in CMLLR space whereas target dataset features that have not had CMLLR transforms can be applied. However, performing VTLN before, and CMLLR after, the MAP adaptation step to learn the necessary feature transformations can recover the gains lost due to a mismatch in the MAP adaptation alignments.

Figure 4:
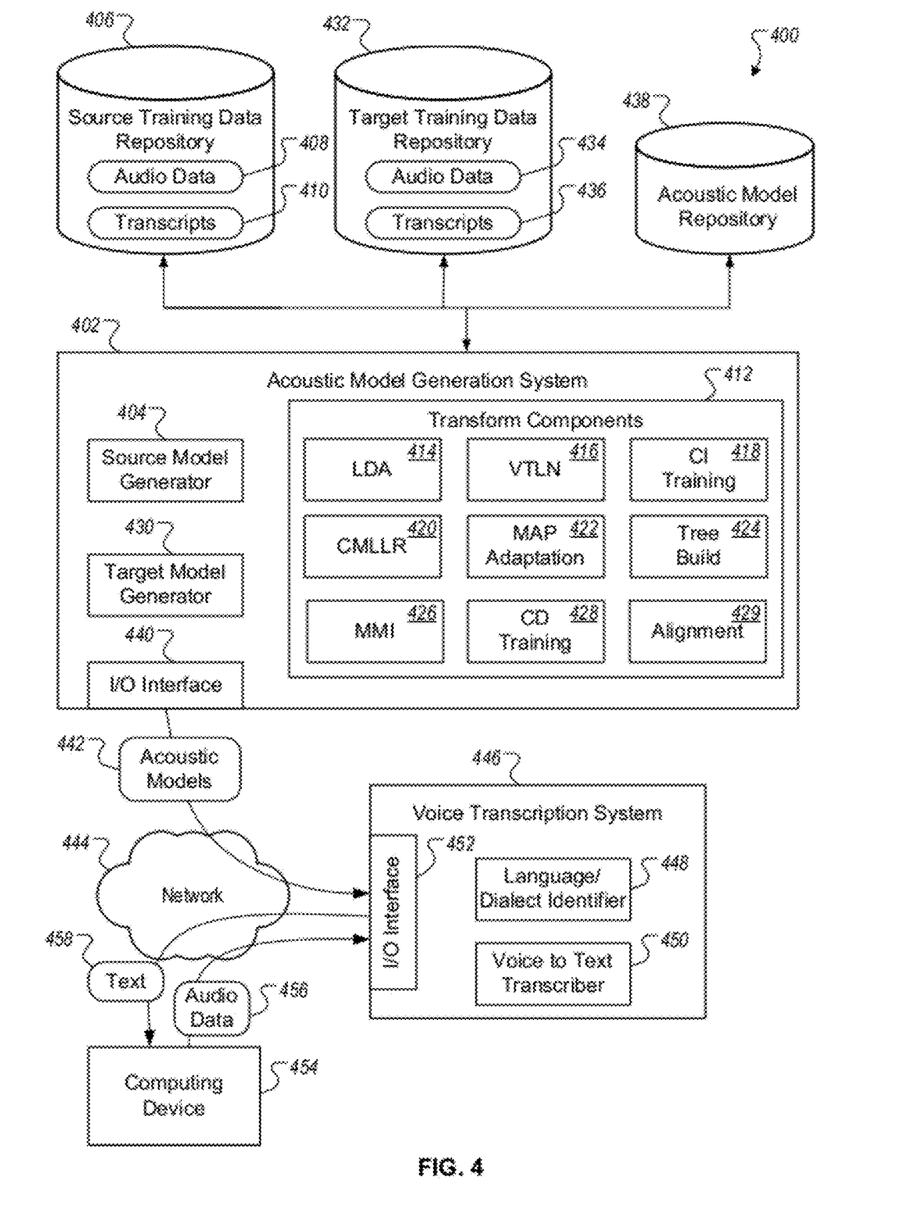
FIG. 4 is a diagram of an example computer system for generating cross-domain and/or cross-dialect acoustic models.

FIG. 4 is a diagram of an example computer system 400 for generating cross-domain and/or cross-dialect acoustic models. The system 400 can be similar to the one or more computing devices 100 described above with regard to FIG. 1. The system 400 can perform any of a variety of appropriate techniques for generating cross-domain and/or cross-dialect acoustic models, such as the technique 200 described above with regard to FIG. 2 and/or the technique 300 described above with regard to FIG. 3.

The example, system 400 includes an acoustic model generation system 402 that can generate source acoustic models and cross-domain/cross-dialect acoustic models from source models. The acoustic model generation system 402 can include one or more appropriate computing devices, such as a computer server and/or a distributed computing system (e.g., a cloud computing system).

The acoustic model generation system 402 includes a source model generator 404 that generates source acoustic models for source languages and/or dialects with at least a threshold amount of training data. The source model generator 404 can use training data from a source training data repository 406 (e.g., database, file system). The training data contained in the source training data repository can include audio data 408 (e.g., digital voice recording, sample voicemail messages) and corresponding textual transcripts 410.

The source model generator 404 can use one or more transform components 412 that can be used to generate a source acoustic model from the training data in the source training data repository 406. Each of the transform components 412 can prepare training data for transformation into a different feature space (e.g., alignment component), perform a transform operation on training data (e.g., LDA, VTLN, CMLLR), or perform an adaptation on an acoustic model (e.g., MAP adaptation). The transform components 412 can include a LDA component 414 that performs an LDA transform, a VTLN component 416 that performs a VTLN transform, a CI training component 418 that performs context-inclusive training, a CMLLR component 420 that performs a CMLLR transform, a MAP adaptation component 422 that adapts a source model to a target language/dialect, a tree build component 424 that builds a context base tree, an MMI component 426 that performs an MMI transform, a CD training component 428 that performs context-dependent training, and/or an alignment component 429 that aligns audio data with corresponding textual transcripts (e.g., aligns the audio data 408 with the transcripts 410 for the source training data in the source training data repository 406).

The source model generator 404 can use one or more of the transform components 412 to generate a source acoustic model from the source training data repository 406. For example, the source model generator 404 can use at least the LDA component 414, the VTLN component 416, the CMLLR component 420, and the alignment component 429 to generate a source acoustic model, similar to the description above with regard to the technique 200.

Generated acoustic models can be stored by the acoustic model generation system 402 in an acoustic model repository 438. Acoustic models can be stored and later retrieved from the acoustic model repository 438 for use in generating other cross-domain/cross-dialect acoustic models.

The acoustic model generations system 402 also includes a target model generator 430 that generates a target acoustic model for a target language/dialect using one or more source acoustic models. The target model generator 430 can generate a target acoustic model using one or more source acoustic models generated by the source model generator 404 and/or stored in the acoustic model repository 438. The target model generator 430 can additionally use training data for the target language/dialect from a target training data repository 432 to generate a target acoustic model. The training data for the target language/dialect in the target training data repository 432 can include audio data 434 and corresponding textual transcripts 436. The target model generator 430 additionally use one or more of the transform components 412. For instance, the target model generator 430 can use at least the VTLN component 416, the CMLLR component 420, and the MAP adaptation component 422, similar to the technique 300 described above with regard to FIG. 3.

The acoustic model generation system 402 can also include an input/output (I/O) interface 440 that can communicate with other computing devices over one or more networks, such as the example network 444. The I/O interface 440 can be any of a variety of appropriate interfaces, such as a wired interface (e.g., Ethernet card) and/or a wireless interface (e.g., wireless network card). The network 444 can be any of a variety of communication networks, such as a local area network (LAN), wide area network (WAN), virtual private network (VPN), the internet, a wired network (e.g., fiber optic network), a wireless network (e.g., 3G/4G wireless network, wifi network), or any combination thereof.

The acoustic model generation system 402 can provide acoustic models 442, such as a source model generated by the source model generator 404 and/or a target model generated by the target model generator 430, over the network 444 to a voice transcription system 446. The voice transcription system 446 can include one or more appropriate computing devices (e.g., computer server, distributed computing system) and can transcribe non-test/training audio data. For example, the voice transcription system 446 can be a computer system that receives digital voice recordings over one or more networks from mobile computing devices (e.g., smartphones, cell phones, personal digital assistants), transcribes the voice recordings using an appropriate acoustic model, and provides a textual transcription of the voice recordings back to the mobile computing devices. In another example, the voice transcription system 446 can be a back-end system that provides textual transcripts of voice recordings from one or more front-end systems, such as an email system (e.g., GMAIL) and/or a mapping system (e.g., GOOGLE MAPS).

The voice transcription system 446 can include an I/O interface 452, similar to the I/O interface 440 of the acoustic model generation system 402, that is configured to send and receive information across one or more communication networks (e.g., the network 444). The voice transcription system 446 can also include a language/dialect identifier 448 that identifies a language/dialect corresponding to a particular voice recording. Such identification can be used to select one or more acoustic models to use for transcribing the particular voice recording. A variety of techniques can be used to identify a language/dialect associated with a voice recording, such as acoustic analysis of a voice recording and/or information associated with a voice recording that indicates a geographic location that is associated with the speaker and/or that identifies a location where the voice recording was made.

The voice transcription system 446 can also include a voice to text transcriber 450 that uses an acoustic model selected by the language/dialect identifier 448 to transcribe audio data 456 that is received from a computing device 454 for transcription. The voice to text transcriber 450 can use one or more techniques discussed above with regard to FIGS. 1-3 to convert the audio data 456 into a feature space that is compatible with the acoustic models 442, from which an accurate textual transcription can be generated. The voice transcription system 446 can provide text 458 corresponding to the audio data 456 back to the computing device 454. The computing device 454 can be any of a variety of computing devices and/or systems, such as a client computing device and/or a front-end computer system.

Figure 5:
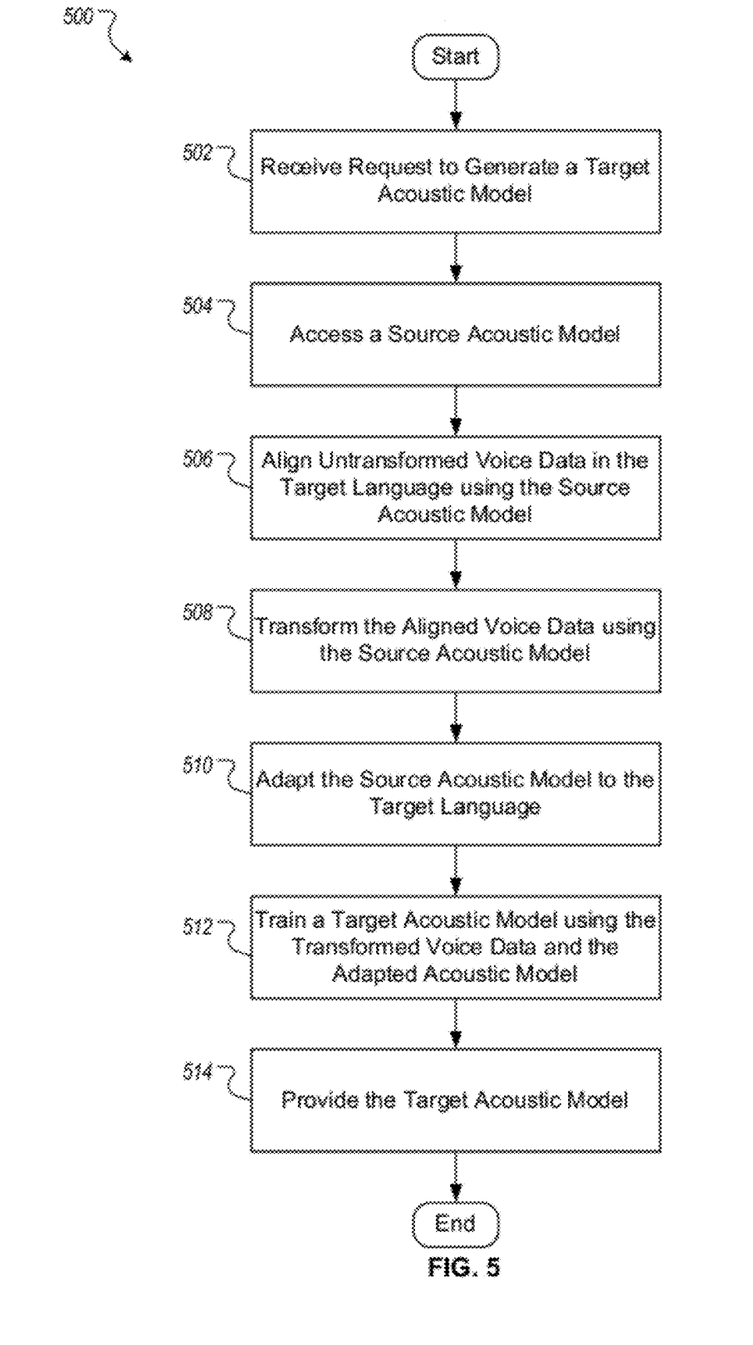
FIG. 5 is a flowchart of an example technique for generating cross-domain and/or cross-dialect acoustic models.

FIG. 5 is a flowchart of an example technique 500 for generating cross-domain and/or cross-dialect acoustic models. The example technique 500 can be performed by one or more appropriate computing devices, such as the one or more computing devices 100 described above with regard to FIG. 1 and/or the computer system 400 described above with regard to FIG. 4. The example technique 500 can be similar to the techniques 200 and/or 300 described above with regard to FIGS. 2 and 3, respectively.

The example technique 500 can include receiving a request to generate or modify a target acoustic model for a target language (502). For example, the acoustic model generation system 402 can receive a request from another computing system (e.g., the voice transcription system 446) to generate and/or update (modify) an acoustic model for a target language.

A source acoustic model for a source language can be accessed (504). A source acoustic model can be in a transformed feature space, such as a CMLLR feature space. A source acoustic model can be generated by performing LDA, VTLN, and CMLLR transform operations on training data in the source language. A source acoustic model that is accessed may have at least a threshold level of accuracy on test audio data.

For example, a source acoustic model can be accessed by the target model generator 430 by accessing the acoustic model repository 438 and/or through communication with the source model generator 404, which can generate the source acoustic model.

In some implementations, a target language and a source language can be different dialects of a common language (e.g., U.S. English and U.K. English). In some implementations, a target language and a source language are different languages (e.g., English and French).

Untransformed voice data in the target language can be aligned using the source acoustic model (506). The untransformed voice data (e.g., digital voice recordings) can be aligned with corresponding textual transcripts so that phonemes in the textual transcripts are aligned with corresponding segments of the voice data. The untransformed voice data can be in an untransformed feature space, but can be aligned using the source acoustic model, which is in a transformed feature space. For instance, the source acoustic model can be an LDA feature space, a VTLN feature space, and/or a CMLLR feature space. For example, the target model generator 430 can align the audio data 434 with the transcripts 436 using the alignment component 429 and a source acoustic model provided by the source model generator 404 and/or accessed from the acoustic model repository 438.

The aligned voice data can be transformed according to a particular transform operation using a source acoustic model (508). For example, the audio data 434 can be transformed using the VTLN component 416 and a source acoustic model provided by the source model generator 404 and/or accessed from the acoustic model repository 438.

The source acoustic model can be adapted to the target language (510). For example, the target model generator 430 can use the MAP adaptation component 422 to adapt a source acoustic model provided by the source model generator 404 and/or accessed from the acoustic model repository 438 to the target language. The source model can be adapted using untransformed and/or transformed voice data for the target language, such as the audio data 434.

A target acoustic model can be trained for the target language using the transformed voice data and the adapted acoustic model (512). For example, the target acoustic model can be generated using one or more transform operations that are performed on the transformed voice data, such as LDA, CMLLR, VTLN, and/or MMI transform operations. In another example, the target model generator 430 can generate a target acoustic model using the CMLLR component 420 and the MMI component 426.

The target acoustic model can be provided in association with the target language (514). For example, the acoustic model generation system 402 can provide the target acoustic model to the acoustic model repository 438 and/or to the voice transcription system 446.

Example empirical data from testing of the techniques described above using voicemail messages are presented with regard to Tables 1 and 2 (below). Table 1 (below) depicts data set statistics and accuracy figures for Western Europe transcription systems as well as those for comparison U.S. and U.K. English systems. Note that the example U.K. English system here is built from a flat start, corresponding to UKFlat-Big in Table 2, provided below.

TABLE 1

|  | US English | UK English (UKFlatBig) | Language 1 | Language 2 | Language 3 | Language 4 |
|---|---|---|---|---|---|---|
| Train set size (hrs) | 425 | 190.61 | 198.1 | 197.03 | 192.17 | 190.49 |
| Test set size (hrs) | 3.67 | 3.61 | 4.79 | 4.26 | 4.28 | 4.13 |
| Avg. train message duration (sec) | 29.0 | 27.9 | 33.5 | 31.9 | 31.0 | 36.3 |
| LM Training Set (M words) | 26.4 | 28.3 | 1.8 | 1.9 | 1.8 | 1.6 |
| Test Vocabulary Size | 51829 | 63164 | 31800 | 27145 | 25781 | 29623 |
| Test Set OOV (%) | 0.6 | 0.4 | 1.4 | 0.9 | 0.9 | 1.3 |
| Test Set perplexity | 54.0 | 35.3 | 56.5 | 42.9 | 54.6 | 90.6 |
| CD state inventory size | 6662 | 3768 | 3684 | 3655 | 2527 | 3327 |
| Word Error Rate (%) | 25.0 | 19.9 | 25.2 | 21.9 | 22.5 | 24.6 |

Table 1 reports statistics about training and test sets, as well as experimental results on each system. The U.S. English system cited here is different from the others in that its acoustic and acoustic models are trained on a much larger corpus. The acoustic model is trained on 425 hours of voicemail recordings, whereas the acoustic model interpolates amongst a number of text data sources, including a broadcast news transcription corpus. In addition, Switchboard data is used together with the voicemail transcripts to produce the word list used for the U.S. English system, hence resulting in its larger vocabulary size (over 51K words). Explanations for the European languages, which had smaller training set size, being transcribed at a similar to or better WER level than the larger U.S. English system include the U.S. English test set including some real voicemail recordings whereas those for the European languages contained simulated voicemails from data collection subjects; and the training and test sets of the European languages having been constructed in a way to ensure no speaker overlap between the two tests. However, it is possible that the simulated voicemail collection scenario introduced an unrealistic amount of acoustic and linguistic similarity between training and test. However, anecdotal reports of system quality in test transcriptions of real voicemails suggest that the quality is similar to that of the U.S. English system.

To separate the effect of simultaneously improved acoustic modeling and standard acoustic modeling, various combinations of models were tested. Table 2 (below) shows the outcome of these experiments. In this table, U.S. is the U.S. English system incorporating all available acoustic and acoustic model training data. USSmallLM is the same acoustic model, but only using the U.S. voicemail transcriptions for LM training. UKMapBig is the adaptation-based U.K. English acoustic model with an acoustic model interpolating all available English LM data sources, including the U.K. transcripts. UKMap2Big is the same MAP-adaptation setup but adapting from a flat start model. UKFlatBig is a flat start U.K. acoustic model with the same LM data sources. UKFlatSmall is the same acoustic model but an LM only using the U.K. transcripts for LM training. UKFlatSmall2 is the same as UKFlatSmall but using only the training data to generate the system vocabulary.

TABLE 2

| System | Word Error Rate (%) |
|---|---|
| US | 25.0 |
| USSmallLM | 27.4 |
| UKMapBig | 19.3 |
| UKMap2Big | 19.8 |
| UKFlatBig | 19.9 |
| UKFlatSmall | 23.1 |
| UKFlatSmall2 | 23.2 |

As can be seen from Table 2, the gain from MAP adaptation (UKFlatBig to UKMapBig) is 3% relative WER. Since by design the adapted U.K. system shares the context-dependent (CD) state set of the U.S. system, it has 6662 CD states, as compared to 3768 states in the flat start system. Hence, it is possible that the larger CD state inventory yields better accuracy and not the fact that the system is adapted from a more robust U.S. model. To measure this, experiments with UKMap2Big, which used the MAP adaptation recipe, were conducted but started from the U.K. flat start as the model to adapt. Hence the number of CD states in the resulting recipe was also 3768. In such an example, the UKMapBig improves on UKMap2Big by 2.5% relative WER improvement, hence providing an indication that cross-dialect MAP adaptation yields a small but solid improvement beyond that gained by simply increasing the model size.

Other experiments also show that additional sources of acoustic model training improve system performance. For instance, adding the U.S. transcriptions and other sources of acoustic modeling data to a system (UKFlatSmall to UKFlatBig) reduces WER by 13.9% relative. In contrast, in the U.S. system, which benefits from larger acoustic models, a smaller 8.8% relative improvement from incorporating the additional acoustic model training data (USSmallLM to US) was provided. This can indicate that alternate sources of acoustic model training data for languages for which a relatively small corpus of acoustic data is available can be used to improve WER.

Figure 6:
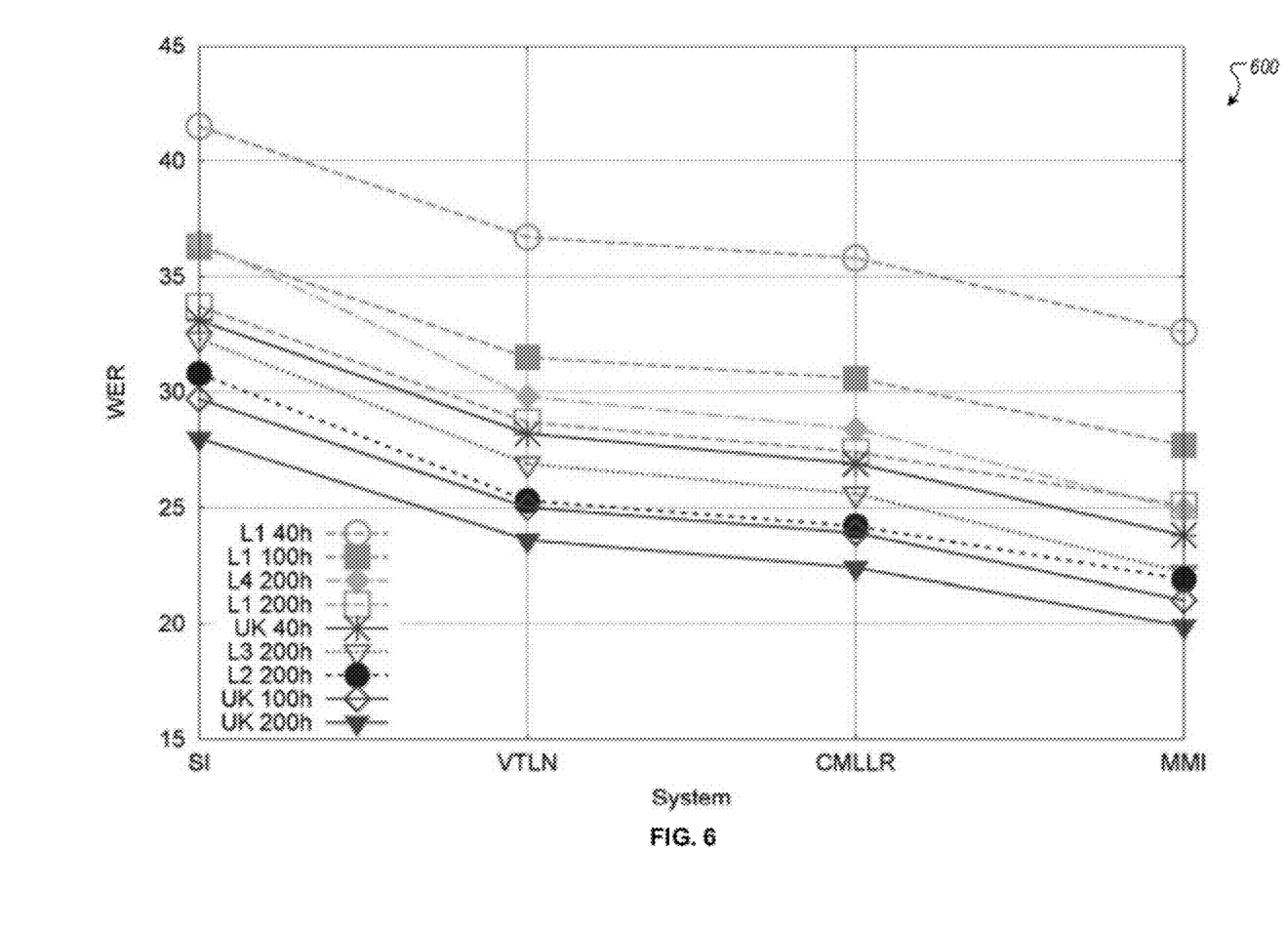
FIG. 6 is a graph that depicts example results from an additional set of experiments.

FIG. 6 is a graph 600 that depicts example results from an additional set of experiments to measure the progression in accuracy increases with successive acoustic modeling steps, as well as the gain from increasing the size of the training corpus. As presented in the graph 600, SI is a speaker-independent model, VTLN has Vocal Tract Length Normalization warping applied to the observations, CMLLR is the multi-pass system obtained after learning an adaptive transformation matrix per voicemail, and MMI is using discriminative training to refine the models. The graph 600 shows that each system displays an improvement at every step of the training recipe (SI to VTLN to CMLLR to MMI). In addition, as the training set size is increased from ⅖ to ½ to all of the available training data (40 h, 100 h, and 200 h, respectively), system quality improves across the board (due to space constraints, for which this comparison for the UKFlatBig system and Language 1 is given).

Figure 7:
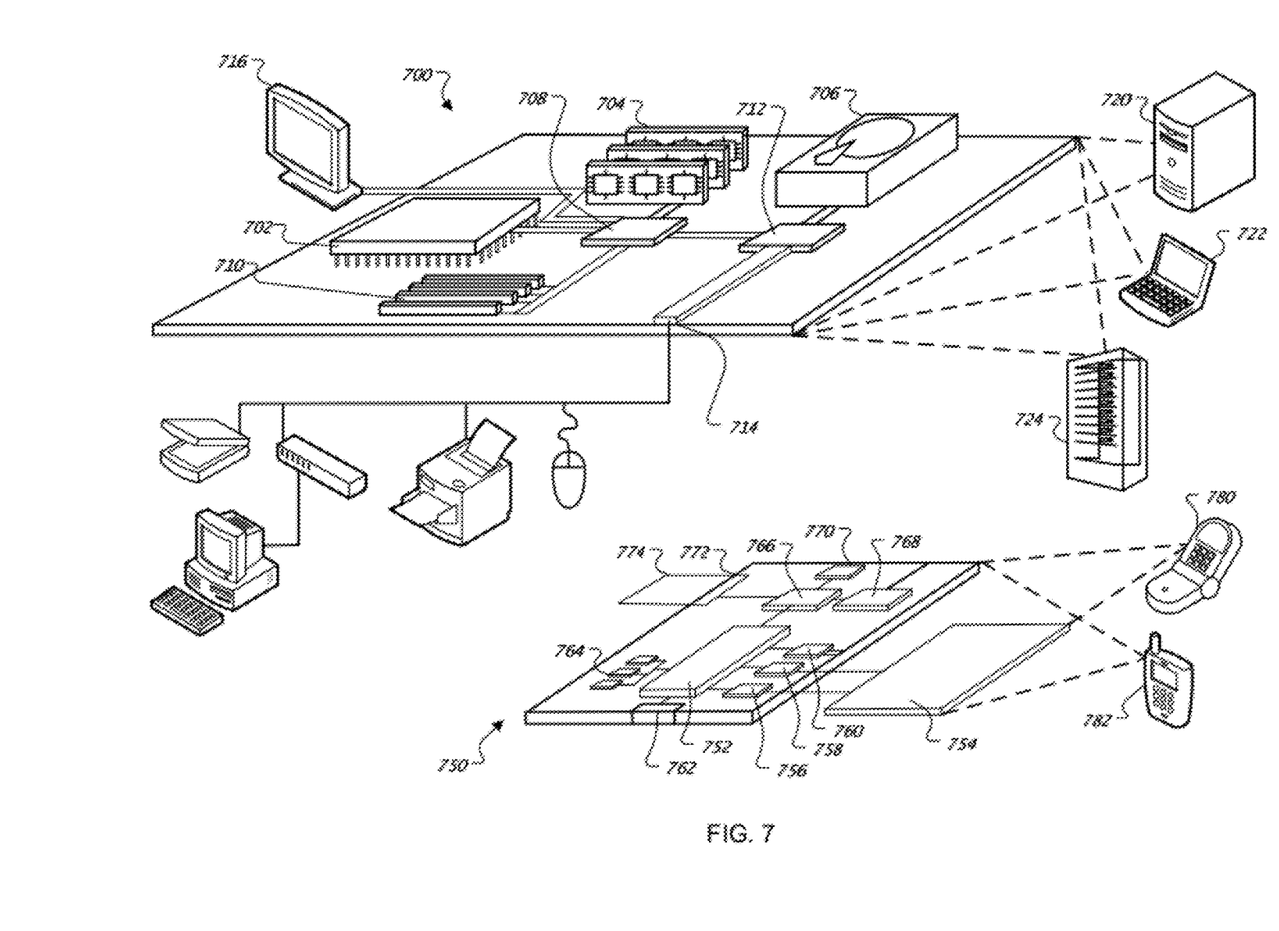
FIG. 7 is a block diagram of example computing devices.

FIG. 7 is a block diagram of example computing devices 700 and 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally, computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700 and 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a secure manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for generating acoustic models may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, at a computer system, a request to generate or modify a target acoustic model for a target language;
accessing, by the computer system, a source acoustic model for a source language, wherein the source acoustic model includes information that maps acoustic features of the source language to phonemes in a transformed feature space;
aligning, using the source acoustic model in the transformed feature space, untransformed voice data in the target language with phonemes in a corresponding textual transcript to obtain aligned voice data, wherein the untransformed voice data is in an untransformed feature space;
transforming the aligned voice data according to a particular transform operation using the source acoustic model to obtain transformed voice data;
adapting the source acoustic model to the target language using the untransformed voice data in the target language to obtain an adapted acoustic model; and training, by the computer system, a target acoustic model for the target language using the transformed voice data and the adapted acoustic model; and providing the target acoustic model in association with the target language.

2. The computer-implemented method of claim 1, wherein the transformed feature space of the source acoustic model is a Constrained Maximum Likelihood Linear Regression (CMLLR) feature space that is generated from a CMLLR transform operation.

3. The computer-implemented method of claim 1, wherein the source acoustic model is generated from performance of a Linear Discriminant Analysis (LDA) transform operation, Vocal Tract Length Normalization (VTLN) transform operation, and a CMLLR transform operation on training data in the source language, wherein the training data comprises voice data in the source language and corresponding textual transcripts.

4. The computer-implemented method of claim 1, wherein the particular transform operation comprises a VTLN transform operation that is performed on the aligned voice data using the source acoustic model.

5. The computer-implemented method of claim 1, wherein the source acoustic model is adapted to the target language by performing a maximum a posteriori (MAP) adaptation operation on the source acoustic model using the untransformed voice data in the target language.

6. The computer-implemented method of claim 1, wherein training the target acoustic model comprises performing a CMLLR transform operation and a maximum mutual information (MMI) transform operation using the transformed voice data and the adapted acoustic model.

7. The computer-implemented method of claim 1, wherein the target language and the source language comprise different dialects of a common language.

8. The computer-implemented method of claim 1, wherein the target language and the source language comprise different languages.

9. A system comprising:
a computer system;
an interface of the computer system to receive a request to generate or modify a target acoustic model for a target language;
an acoustic model repository of the computer system to provide access to a source acoustic model for a source language, wherein the source acoustic model includes information that maps acoustic features of the source language to phonemes in a transformed feature space;
an alignment component of the computer system to use the source acoustic model in the transformed feature space to align untransformed voice data in the target language with phonemes in a corresponding textual transcript to obtain aligned voice data, wherein the untransformed voice data is in an untransformed feature space; and
a target model generator of the computer system to i) transform the aligned voice data according to a particular transform operation using the source acoustic model to obtain transformed voice data, ii) adapt the source acoustic model to the target language using the untransformed voice data in the target language to obtain an adapted acoustic model; and iii) train a target acoustic model for the target language using the transformed voice data and the adapted acoustic model;
wherein the interface is further configured to provide access to the target acoustic model.

10. The system of claim 9, wherein the transformed feature space of the source acoustic model is a Constrained Maximum Likelihood Linear Regression (CMLLR) feature space that is generated from a CMLLR transform operation.

11. The system of claim 9, further comprising a source model generator of the computer system to generate the source acoustic model from performance of a Linear Discriminant Analysis (LDA) transform operation, Vocal Tract Length Normalization (VTLN) transform operation, and a CMLLR transform operation on training data in the source language, wherein the training data comprises voice data in the source language and corresponding textual transcripts.

12. The system of claim 9, wherein the particular transform operation comprises a VTLN transform operation that is performed on the aligned voice data using the source acoustic model.

13. The system of claim 9, wherein the source acoustic model is adapted to the target language by performing a maximum a posteriori (MAP) adaptation operation on the source acoustic model using the untransformed voice data in the target language.

14. The system of claim 9, wherein training the target acoustic model comprises performing a CMLLR transform operation and a maximum mutual information (MMI) transform operation using the transformed voice data and the adapted acoustic model.

15. The system of claim 9, wherein the target language and the source language comprise different dialects of a common language.

16. The system of claim 9, wherein the target language and the source language comprise different languages.

17. A computer-implemented method comprising:
obtaining, by a computer system, aligned voice data that comprises untransformed voice data in the target language that has been aligned with phonemes in a corresponding textual transcript using a source acoustic model for a source language, wherein the source acoustic model includes information that maps acoustic features of the source language to phonemes in a transformed feature space, and the untransformed voice data is in an untransformed feature space;
transforming the aligned voice data according to a particular transform operation using the source acoustic model to obtain transformed voice data;
adapting the source acoustic model to the target language using the untransformed voice data in the target language to obtain an adapted acoustic model; and
training, by the computer system, a target acoustic model for the target language using the transformed voice data and the adapted acoustic model; and
providing the target acoustic model in association with the target language.

18. The computer-implemented method of claim 17, wherein the transformed feature space of the source acoustic model is a Constrained Maximum Likelihood Linear Regression (CMLLR) feature space that is generated from a CMLLR transform operation.

19. The computer-implemented method of claim 17, wherein the source acoustic model is generated from performance of a Linear Discriminant Analysis (LDA) transform operation, Vocal Tract Length Normalization (VTLN) transform operation, and a CMLLR transform operation on training data in the source language, wherein the training data comprises voice data in the source language and corresponding textual transcripts.

20. The computer-implemented method of claim 17, wherein the particular transform operation comprises a VTLN transform operation that is performed on the aligned voice data using the source acoustic model.

* * * * *